STANSBURY & RIDGAWAY.
Oakum Picker.
No. 2,428.
2 Sheets—Sheet 1.
Patented Jan'y 17, 1842.
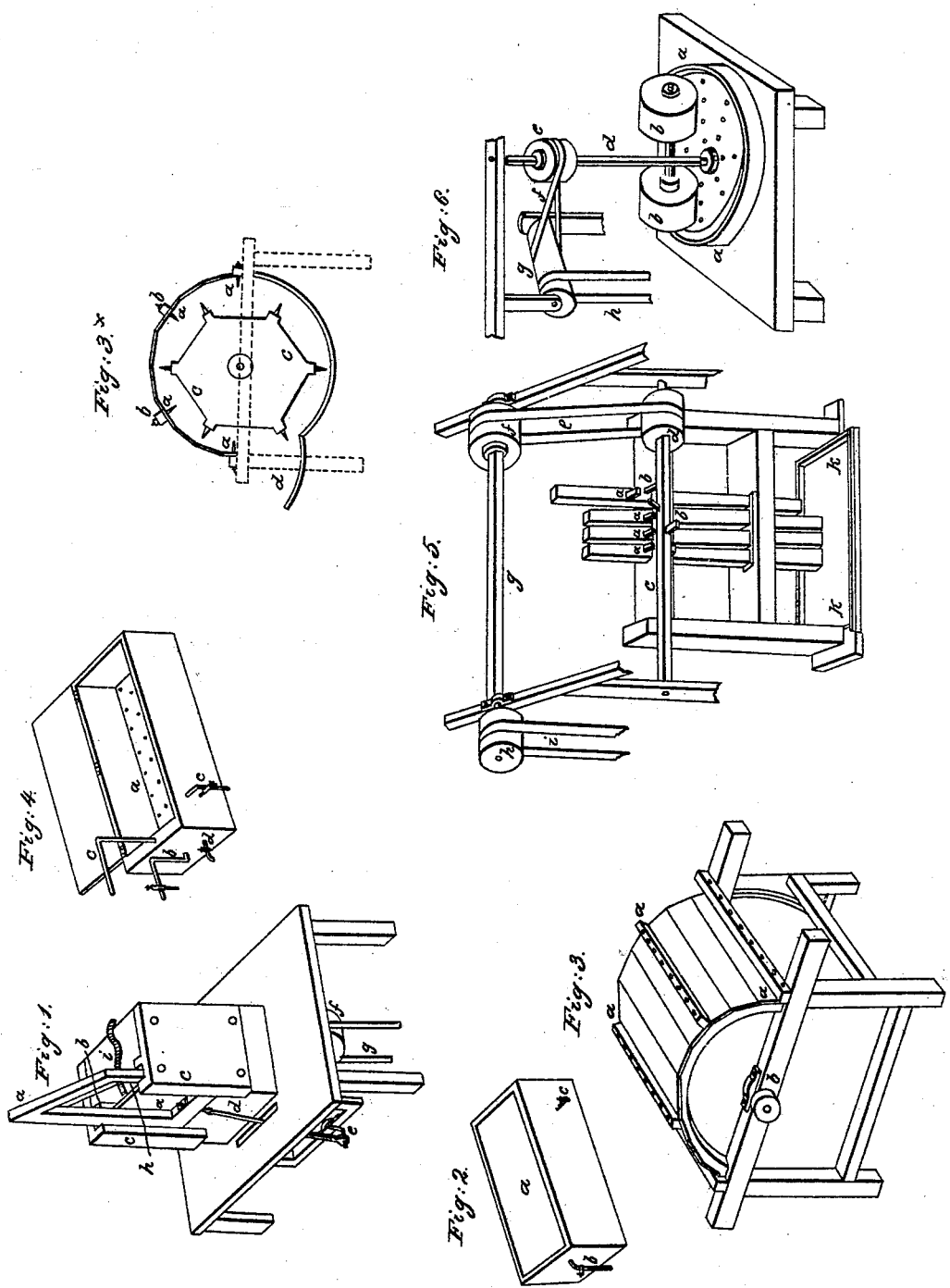

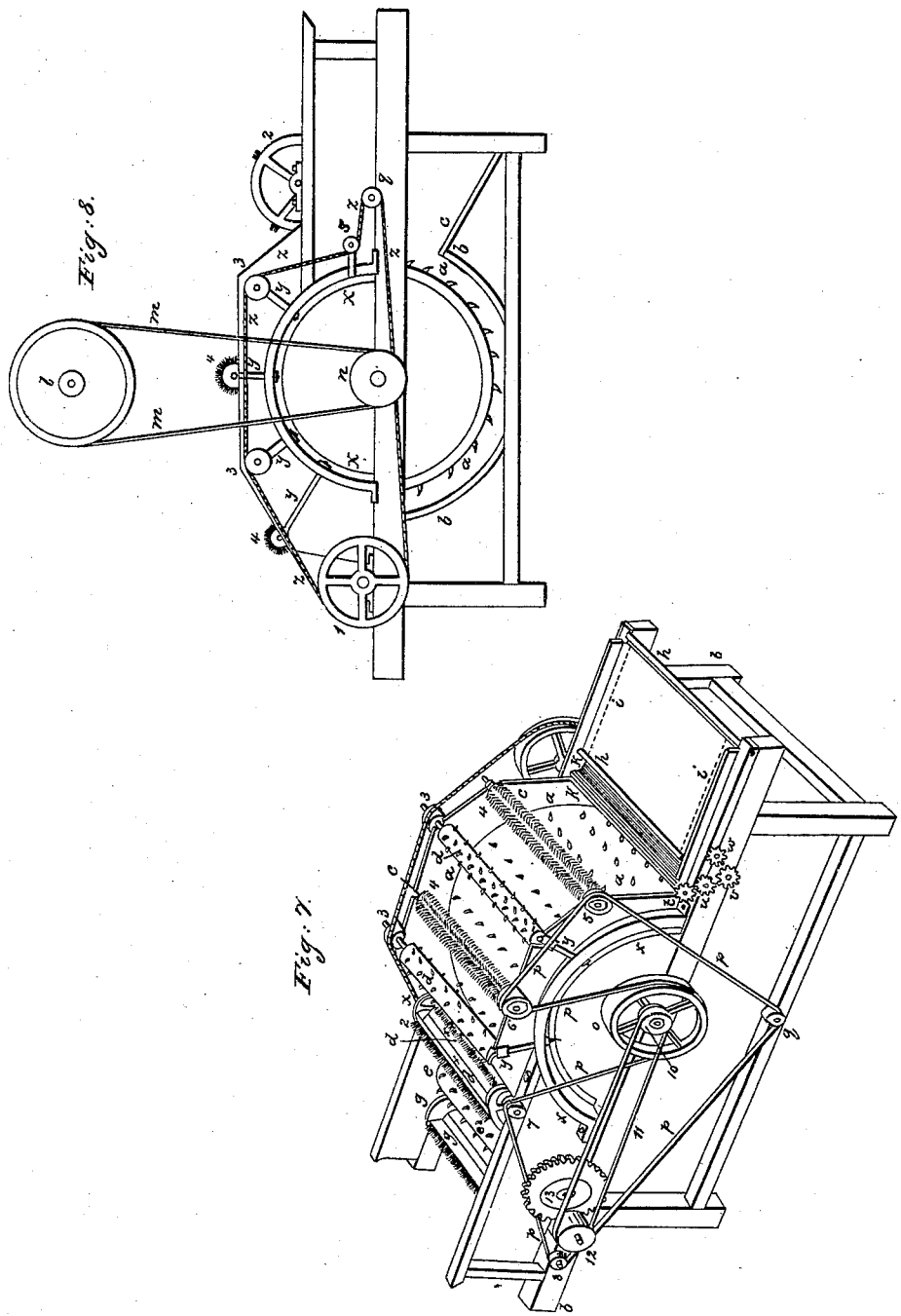

UNITED STATES PATENT OFFICE.

JOHN STANSBURY AND WM. RIDGAWAY, JR., OF BALTIMORE, MD.

IMPROVEMENT IN THE COMBINATION OF MACHINERY FOR PICKING OAKUM.

Specification forming part of Letters Patent No. 2,428, dated January 17, 1842.

*To all whom it may concern:*

Be it known that we, JOHN STANSBURY and WILLIAM RIDGAWAY, Jr., both of the city of Baltimore and State of Maryland, have invented a new and useful Improvement on the Machine for Picking Oakum; and we do hereby declare that the following, with the accompanying drawings, is a full and exact description.

The rope is cut into pieces of suitable length—say from four to eight inches—by the cutter represented at Figure 1. $a\ a$ is the gate, in which a knife, $b$, in the head stands in a raking position. $c\ c$ are metal pieces, having grooved guides, in which the gate moves up and down. $d$ is the pitman between the gate and the crank $e$. $f$ and $g$ represent the driving-pulley and a section of the belt. $h$ is a stationary knife or shears against which knife $b$ cuts, to divide the rope represented at $i$. The rope is now ready to introduce into a trough to soak.

$a$, Fig. 2, is the trough. $b$ is a pipe for introducing either warm or cold water. $c$ is a cock for letting off the water. After the pieces of rope are sufficiently soaked, they are broken by means of the machine represented at Fig. 3, which consists of a cylinder of spikes running under an arched half-circle of spikes. $a\ a\ a$ represent the arch; $b$, a driving-pulley on the end of the axle of the cylinder.

Fig. 3× is a side view of the same. $a\ a$, &c., represent the spikes in the arch. They are secured by passing through pieces of timber and having nuts on the screw ends, as $b\ b\ b$, &c. $c\ c$ represent the cylinder with spikes. The cylinder may be two and one-half feet long and one foot and one-half diameter. The spikes may be four inches apart and four inches long in both the arch and the cylinder, and round, one inch thick at the butt, and tapering to a point. The pieces of rope are introduced at the door $d$, which is now represented open. The rope is now broken, say, into strands, and carried to a steaming-trough, (represented at Fig. 4,) which may be from four to eight feet long, and two and one-half feet wide, and three feet deep. It has a colander or pierced partition, as at $a$, about six inches above the bottom, on which the rope lies. The steam is introduced under this pierced partition by the pipe $b$. $c$ is a pipe to introduce cold water, if required. $d$ is a cock to let off water. $e$ is a waste-steam pipe. After the strands are sufficiently steamed or softened, they are again put into the breaker, Fig. 3, or one like it, but rather finer, to undergo a more thorough operation, where it will become worked to the consistence of tow, in which state it is carried to the picker, which is to be described hereinafter; but previously to carrying it to the picker, if it is thought necessary, it is partially or nearly dried and taken to the beater, Fig. 5, which consists of four or more wooden rods, each weighing fifty pounds or more, twelve inches square, and five feet long. Each has a horizontal branch, as $a\ a$, &c., by which it is raised by the wings $b\ b$, &c., on the shaft $c$. This shaft receives motion by means of the pulley $d$, belt $e$, pulley $f$, shaft $g$, pulley $h$, and belt $i$. The tow is laid in the trough $k\ k$ to be beaten till it becomes soft. It must then go to the picker. The ropes sometimes contain so much tar or the tar adheres so firmly to the rope that it requires boiling, and also pressing, which pressing or rubbing is performed by the machine represented at Fig. 6. The ropes or strands are laid on the circular metal trough $a\ a$, which is pierced with holes to let the water pass off downward. $b\ b$ are metal wheels, each of which turns on a horizontal arm, as $c$, of the shaft $d$, which is propelled by the pulley $e$, belt $f$, pulley $g$, and belt $h$. The trough may be six feet diameter, the wheels four feet diameter, and as broad as the trough will admit. This machine prepares the stuff for the picker by squeezing and working the strands asunder. The surface of these rollers is smooth, so as not to cut the material. The effect of the machines represented by Figs. 5 and 6 are to soften the oakum or take the harsh feel out of it.

Fig. 7 represents the picker, which consists of the main cylinder or picker $a\ a\ a$, supported on the frame $b\ b$. This cylinder may be three feet diameter and two to three feet long. The teeth are one inch long and round, and three-eighths inch thick at the root, and come regularly to a point. They are one inch apart laterally in each row, and about twelve to fourteen rows on the cylinder; but the teeth in each row are so placed that in the revolution they make circles around the cylinder as if the teeth were half that distance asunder. $c$ and *c* are strippers, six inches diameter, including the teeth, which project one-fourth of an inch, and are about half an inch apart laterally, and in lateral rows one inch apart around the cylinder, the teeth of one-eighth wire and pointed. *d d* are workers, whose cylinders are six inches diameter, including the teeth. The teeth in these are the same size as those in the main cylinder, and the same distance apart. *e e* is another worker, twelve to eighteen inches diameter, and the teeth the same size and distance apart as those last described. The strippers and workers are supported on an iron arch, *x x*, from which project the puppet-heads, as *y y*, &c., in Figs. 7 and 8. *f f f* is a cylindrical brush of twelve to fourteen inches diameter. There may be four rows of brushes. The brushes may be of bristles or a mixture of bristles and wire. The object of these brushes is to clear the teeth from the oakum on the main cylinder. This brush is similar to the brush of the cotton-gin. *g g* is an additional brush, with two or more rows of brushes like the one just described. This brush is to clean the teeth of worker *e*. *h h* are rollers to receive an apron, which is shown by the dotted lines *i i*. On this apron the tow is spread, and it is introduced to the main picker by means of the fluted feed-rollers *k k*.

Fig. 8 represents Fig. 7 turned around, the lower part of the side casing withdrawn, so as to show part of the end of the main picker and the raking position of the teeth, as *a a*; *b b*, the concave curb or casing. *c* is the vent. 1 2 3 4 are the same parts in both Figs. 7 and 8. *l*, Fig. 8, is a pulley which drives the machine; *m m*, a belt which communicates motion from *l* to pulley *n*, on the shaft of the main picker. From pulley *o*, Fig. 7, on the other end of the shaft of the main picker, a belt, *p p p p p p*, passes round the pulleys 5 and 6 of the strippers and the pulleys 7 and 8 of the brushes, (*q* being a mere roller, to carry the belt conveniently to its proper place,) to give the requisite motion to the strippers and brushes. 10 is a pulley on the shaft of the main picker, which, by the belt 11, gives motion to pulley 12, on a pin-shaft attached to the frame of the machine. Immediately behind pulley 12 on the pin-shaft is a pinion, which works into cog-wheel 13, which cog-wheel is on shaft of worker *e e*. On the other end of the shaft of worker *e* is the pulley *q*, Fig. 8, from which, by means of the belt *z z z z z*, the workers 3 3 and 1 of the feed-roller are moved. *s* is a tightening-pulley. *t*, Fig. 7, is a pinion on the end of the upper feed-roller, gearing into *u*, a pinion on the under feed-roller. *u* gears into *v*, a pinion on a pin-shaft, to give motion to *w*, a pinion on the end of the inner apron-roller. The main cylinder or picker *a a*, Fig. 7, turns upward from the feeders. The workers, strippers, and brushes move contrary to it. The teeth of the strippers and brushes run the same speed as those of the main cylinder, which makes about two hundred and fifty revolutions in a minute. The teeth of the workers may run about one-fifth to one-tenth as fast as the others. The main picker, with the feeding-rollers, which feeding-rollers must be fluted or toothed so as to firmly hold the stuff to let the picker operate, will pick oakum when the rope is prepared by steaming and beating, as before described, but not so well as with the additional workers and strippers.

We claim as our invention and desire to secure by Letters Patent—

The combination of the machine for picking, represented by Figs. 7 and 8, with the soaking, steam, and boiling apparatus, Figs. 2 and 4, and breaker, Fig. 3, the beaters, Fig. 5, the pressers, Fig. 6, and the knife, Fig. 1— that is to say, the combination of the picking-machine with each of the other machines separately and with the whole of them—for the purpose and in the manner described.

JNO. STANSBURY.
WILLIAM RIDGAWAY, Jr.

Witnesses:
  LEVI WILLIAMS,
  N. STANSBURY.